Patented June 22, 1926.

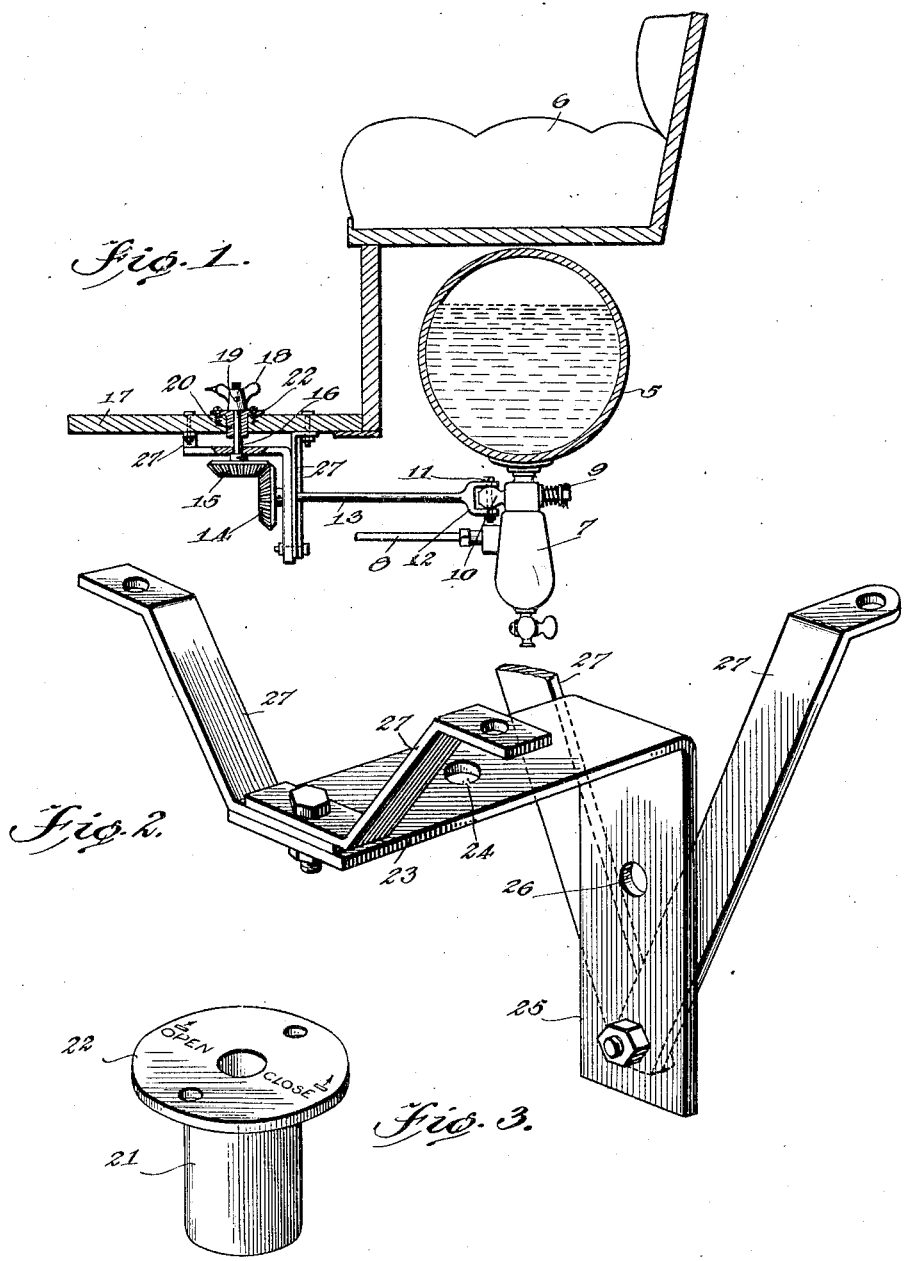

1,590,010

UNITED STATES PATENT OFFICE.

VERLAND E. WUTHNOW, OF DILLON, KANSAS.

GAS CUT-OFF.

Application filed December 28, 1925. Serial No. 78,052.

My invention elates to cut-off attachments for gasoline tanks and more particularly to such devices as adapted for use on Ford cars.

The primary object of my invention is to provide a device of this character which affords the owner of the car a secret means by which he may cut off the supply of fuel necessary to operate the car thus preventing unauthorized use thereof.

A further object is to provide means conveniently placed near the driver's seat for cutting off the supply of gas from the gas tank of an automobile thereby eliminating the objections incident to the usual practice of crawling under the car in order to accomplish this result.

Another object is to provide a device of this character which is simple and durable in construction, reliable in performance and inexpensive to manufacture.

Other objects and advantages will become apparent from the following detailed description when viewed together with the accompanying drawing forming part hereof, in which—

Figure 1 is a side elevational view of my device as attached to a gas tank located beneath the driver's seat of an automobile.

Figure 2 is a perspective view of the cut-off supporting construction, and

Figure 3 is an enlarged perspective view of the vertical shaft bushing.

Referring now to the drawings I have disclosed a preferred form of my invention as constructed for use in connection with a Ford gas tank 5 located beneath the driver's seat 6, such tanks usually being provided with a sediment trap 7 from which the gas feed line 8 extends to the carbureter of the engine. At the top of such sediment trap is provided a petcock 9 adapted for cutting off the flow of gas from the tank to the carbureter. I provide an opening in the handle 10 of the pet cock in which is inserted a pin 11 which secures the ends of a yoke 12 thereto, said yoke being carried on one end of a horizontal shaft 13, on the opposite end of which is mounted a bevel gear 14.

A second bevel gear 15 is mounted on the lower end of a vertical shaft 16, the said gears being arranged in enmeshed relation. The shaft 16 extends upwardly through the floor 17 of the driver's compartment and is provided on its end with a wing nut 18 which is keyed on the shaft by a pin 19 or by any other suitable means. Thus it is obvious that the turning of the wing nut operates to turn the pet cock on or off as desired through the gear mechanism just described.

A bushing 20 is fitted in the floor having an opening through which the vertical shaft 16 is inserted, said bushing comprising a shank 21 and a head 22 in which are formed openings for receiving screws so as to fixedly secure the same to said floor. The top surface of the head of said bushing is provided with markings to indicate the correct position of the wing nut to correspond with the open and closed position of the pet cock.

A suitable supporting means for the pet cock operating mechanism is provided for securing the same in fixed relation beneath the floor, said means comprising a bracket having a horizontal portion 23 in which is provided an opening 24 through which the vertical shaft 16 is inserted and a vertical portion 25 in which is provided an opening 26 through which the horizontal shaft 13 is inserted. The ends of the bracket are each provided with a pair of upwardly extending arms 27 of suitable length which are bolted or otherwise secured to the floor. As above described and illustrated in the drawing the mechanism is firmly secured in operative position.

While I have disclosed a preferred form of my invention it is obvious the same is susceptible of various changes and modifications without departing from the spirit of the invention or the scope of the appended claims and I accordingly claim as my own all such forms to which I am entitled.

I claim:

1. A cut-off attachment for automobile gas tanks having a pet cock comprising a vertical shaft, a bevel gear on the lower end thereof, a horizontal shaft, a bevel gear on one end thereof co-acting with said first named bevel gear, means carried on the upper end of said vertical shaft for turning the same, means carried on the end of said horizontal shaft remote from said gear for attaching to said pet cock, a bracket having a horizontal section for supporting said vertical shaft and a vertical section for supporting said horizontal shaft, a pair of arms at each end of said bracket for attaching the same beneath the floor of the automobile, and a bushing for said vertical shaft having a head disposed above said floor and having indicating means for the position of said pet cock.

2. A device of the character described comprising a vertical shaft, a horizontal shaft, means operatively connecting the same, supporting means for said shafts including an L-shaped bracket invertedly arranged with the horizontal section thereof supporting said vertical shaft and the vertical section supporting said horizontal shaft and a pair of attaching arms for each section of the bracket and a wing nut secured to the upper end of said vertical shaft.

In testimony whereof I affix my signature.

VERLAND E. WUTHNOW.